United States Patent [19]

Richards

[11] Patent Number: 4,481,836
[45] Date of Patent: Nov. 13, 1984

[54] MULTIPLE IDENTICAL COUNTERSHAFT POWERSHIFT TRANSMISSION

[75] Inventor: Elmer A. Richards, Kalamazoo, Mich.

[73] Assignee: Eaton Corporation, Cleveland, Ohio

[21] Appl. No.: 348,527

[22] Filed: Feb. 12, 1982

[51] Int. Cl.³ .................. F16H 3/08; F16H 57/02; F16D 21/02
[52] U.S. Cl. .................. 74/331; 74/606 R; 192/48.91
[58] Field of Search .................. 74/331, 330, 606 R, 74/360; 384/439; 248/558; 192/48.91

[56] References Cited

U.S. PATENT DOCUMENTS

| | | | |
|---|---|---|---|
| Re. 25,458 | 10/1963 | Barth et al. | 74/331 |
| 2,633,753 | 4/1953 | Campooinico | 74/331 |
| 3,105,395 | 10/1963 | Perkins | 74/745 |
| 3,285,100 | 11/1966 | Peltner et al. | 74/331 |
| 3,362,245 | 1/1968 | Francuch et al. | 74/359 |
| 3,500,695 | 3/1970 | Keiser | 74/331 |
| 3,537,335 | 11/1970 | Ezpeleta | 74/331 |
| 3,626,777 | 12/1971 | Langenbeck | 74/331 |
| 3,762,518 | 10/1973 | Hilpert | 192/87.13 |
| 3,802,293 | 4/1974 | Winckler et al. | 74/331 |
| 4,000,662 | 1/1977 | Wolfe | 74/331 |
| 4,152,949 | 5/1979 | Vandervoort et al. | 74/331 |
| 4,269,077 | 5/1981 | Vandervoort | 74/331 |
| 4,333,358 | 6/1982 | Grattapaglia | 74/606 R |
| 4,388,838 | 6/1983 | Richards et al. | 74/331 |

Primary Examiner—Lawrence J. Staab
Assistant Examiner—Bruce F. Wojciechowski
Attorney, Agent, or Firm—C. H. Grace; H. D. Gordon

[57] ABSTRACT

A multiple substantially identical countershaft powershift transmission is provided. The transmission (10) comprises an input shaft (12) and preferably three (16, 18 and 20) input gears and an output gear (22) concentric and rotatable relative thereto. A plurality of substantially identical countershaft assemblies (42, 42A) carrying countershaft gears (54, 56, 58 and 60) constantly meshed with the input gears and output gear surround the input shaft and an output shaft (24) generally coaxial with input shaft (12) and carrying the output gear (22) rotationally fixed thereto are provided. A first double acting friction clutch mechanism (26) for selectively frictionally coupling first speed input gear (16) or third speed input gear (18) to the input shaft and a second double acting friction clutch mechanism (28) for selectively coupling second speed input gear (20) or fourth speed output gear (22) are provided and are concentric and driven by the input shaft (12). Means (V, C) are provided for selectively actuating the clutch portions (30, 32, 36 and 38) of the double acting clutch assemblies with overlapping engagement of the clutch portion being released and the clutch portion being applied.

6 Claims, 8 Drawing Figures

Fig. 1

| CLUTCH ENGAGED \ SPEED | 1ST | 2ND | 3RD | 4TH |
|---|---|---|---|---|
| 30 | X | | | |
| 32 | | | X | |
| 36 | | X | | |
| 38 | | | | X |

| CLUTCH ENGAGED \ SPEED | 1 | 2 | 3 | 4 | 5 | 6 | 7 | 8 |
|---|---|---|---|---|---|---|---|---|
| 30 | X | | | | X | | | |
| 32 | | | X | | | | X | |
| 36 | | X | | | | X | | |
| 38 | | | | X | | | | X |
| 114 | X | X | X | X | | | | |
| 116 | | | | | X | X | X | X |

| SPEED | RATIOS | % STEP |
|---|---|---|
| 8 | 1.000 | |
| | | 22.73 |
| 7 | 1.2273 | |
| | | 22.22 |
| 6 | 1.5000 | |
| | | 22.22 |
| 5 | 1.8333 | |
| | | 20.57 |
| 4 | 2.2105 | |
| | | 22.73 |
| 3 | 2.7130 | |
| | | 22.22 |
| 2 | 3.3158 | |
| | | 22.22 |
| 1 | 4.0526 | |

MULTIPLE IDENTICAL COUNTERSHAFT POWERSHIFT TRANSMISSION

BACKGROUND OF THE INVENTION

1. Field of the Invention

This invention relates to powershift transmissions, or transmission sections, utilizing multiple identical, or substantially identical, countershaft assemblies.

2. Description of the Prior Art

Change gear transmissions, or transmission sections, utilizing multiple substantially identical countershaft assemblies normally driven by an input shaft or input gear and driving an output shaft are well known and widely used, especially for heavy duty vehicles such as trucks and the like. Such transmissions, especially when provided with floating output shafts or mainshafts and/or floating output or mainshaft gears, are highly advantageous as each countershaft is required to carry only an equal portion of the torque load. Examples of such transmissions and a more detailed discusison of the structure and advantages thereof may be seen by reference to U.S. Pat. Nos. 3,105,395 and 3,500,695, both hereby incorporated by reference.

Powershift change gear transmissions are known in the prior art as may be seen by reference to U.S. Pat. Nos. 3,802,293; 3,362,245 and 3,675,508, all hereby incorporated by reference. The advantages of powershifting transmissions, i.e. transmissions providing continuous power from the input to the output thereof during a ratio shifting operation, for certain situations is well known in the art.

Overlapping clutch engagement, as is often a feature of powershifting transmissions, is also well known in the art as may be seen by reference to U.S. Pat. Nos. 3,762,518 and 3,783,985, both hereby incorporated by reference.

While the powershifting transmissions of the prior art have been generally satisfactory, the designs thereof are subject to improvement as structure providing the use of torque sharing substantially identical multiple countershafts in known powershift transmission designs is not seen.

SUMMARY OF THE INVENTION

In accordance with the present invention, the drawbacks of the prior art have been overcome by the provision of a powershift change gear transmission, or transmission section, which utilizes a plurality of substantially identical countershafts, each of which carry a substantially equal torque load for each selectable ratio in the transmission or transmission section. Additionally, as a preferred feature, the transmission is provided with end and intermediate wall configurations, and gearing configurations, allowing the same case, input shaft, output or mainshaft, output or mainshaft gears, clutches, countershafts and countershaft gears to be utilized for both a two (twin) or three (triplet) countershaft transmission.

The above is accomplished by providing a transmission, or transmission section, having an input shaft on or about which three input gears are rotationally supported, an output shaft coaxial with the input shaft and carrying an output gear rotationally fixed thereto, and a plurality of substantially identical countershafts, each countershaft carrying countershaft gears fixed thereto which are constantly meshed with the input gears and the output gear. Friction clutches are provided for rotationaly coupling a selected input gear or the output gear to the input shaft. Of course, coupling of the output gear to the input shaft will provide direct drive relationship between the input and output shafts. In the preferred form, double acting friction clutches are provided for the known cost, weight and axial space saving advantages thereof. When double acting clutches are utilized, the first and third highest ratio clutchable gears are axially adjacent with a conventional double acting friction clutch therebetween for selectively coupling the first or third highest ratio clutchable gear to the input shaft. The second and fourth highest ratio clutchable gears are axially adjacent with a second double acting friction clutch interposed therebetween for selectively coupling the second or fourth highest ratio clutchable gear to the input shaft. Controls and valving are provided for overlapping engagement of the friction clutches as one side of one double acting clutch is engaged and one side of the other double acting clutch is disengaged as is well known in powershaft transmissions.

As is well known, in a direct drive type transmission, the fourth highest ratio clutchable gear will be the output gear which will provide a 1:1 drive ratio when clutched to the input shaft. In an overdrive type transmission, the output gear will be the third highest ratio clutchable gear. Although only a direct drive type transmission is illustrated herein, it is understood the present invention is also applicable to overdrive type transmissions.

Preferably, the end walls and intermediate walls of the transmission are provided with four bores, all equidistant from the centerline or axis of the input shaft, for supporting countershaft bearings and/or providing countershaft passage. The second bore is displaced 120° from the first bore, the third bore is displaced 60° from the second bore and the fourth is displaced 60° from the third bore, all in the same direction of rotation. Additionally, the input shaft mainshaft gears are provided with a number of teeth evenly divisible by both two and three. For a twin countershaft transmission, or transmission section, countershafts are supported by bearings in the first and third bores, for a triplet countershaft transmission, countershafts are supported by bearings provided in the first, second and fourth bores.

Accordingly, it is an object of the present invention to provide a new and improved powershift transmission, or transmission section, utilizing multiple substantially identical countershaft assemblies.

Another object of the present invention is to provide a transmission casing having bearing supporting and/or intermediate walls provided with four bearing support bores and/or countershaft passage bores allowing the casing to be utilized for either a twin or a triplet countershaft transmission.

These and other objects and advantages of the present invention will become apparent from a reading of the detailed description of the preferred embodiment taken in view of the accompanying drawings.

DESCRIPTION OF THE PREFERRED EMBODIMENT

Figure 1:
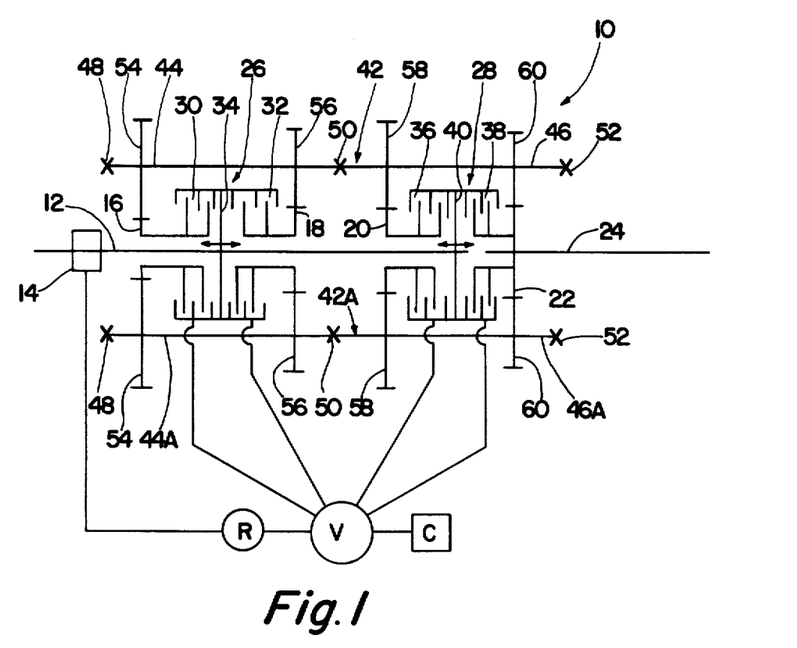
FIG. 1 is a schematic illustration of a four forward speed twin countershaft powershift transmission of the present invention.

Certain terminology will be used in the following description for convenience in reference only and will not be limiting. The words "upwardly," "downwardly," "rightwardly" and "leftwardly" will designate directions in the drawings to which reference is made. The words "forward" and "rearward" will refer, respectively, to front and rear ends of the transmission as same are conventionally mounted in a vehicle, being respectively the left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "simple transmission" is use to designate a change speed transmission wherein the operator may select one of a plurality of single gear reductions. The term "compound transmission" is used to designate a change speed transmission having a main transmission portion or section and an auxiliary transmission portion or section connected in series thereto whereby the selected gear reduction the main transmission portion may be compounded by a further selected gear reduction in the auxiliary transmission portion. The term "transmission" as used herein shall designate a simple or compound transmission or a secion of a compound transmission. The term "upshift" as used herein shall mean the shifting from a lower speed gear ratio to a higher speed gear ratio. The term "downshift" as used herein shall mean the shifting from a higher speed gear ratio to a lower speed gear ratio. The terms "low speed gear", "low gear" and/or "first gear" as used herein shall all designate the gear ratio having the lowest forward speed operation in a transmission or transmission section, i.e. that set of gears having the highest ratio of reduction from the input shaft to the output shaft of the transmission. The terms "high speed gear" and/or "high gear" as used herein shall all designate the gear ratio utilized for the highest forward speed operation in a transmission or transmission section, i.e. that set of gears providing the lowest ratio of reduction from the input shaft to the output shaft of the transmission or transmission section.

While the present invention is especially well suited for transmissions having forward speeds only, such as transmissions that would typically be utilized in industrial applications for driving pumps and the like, it is understood that a reversed mode of operation could be provided in the transmission section illustrated, in an auxiliary transmission section or in an auxiliary device as is well known in the art.

Figure 2:
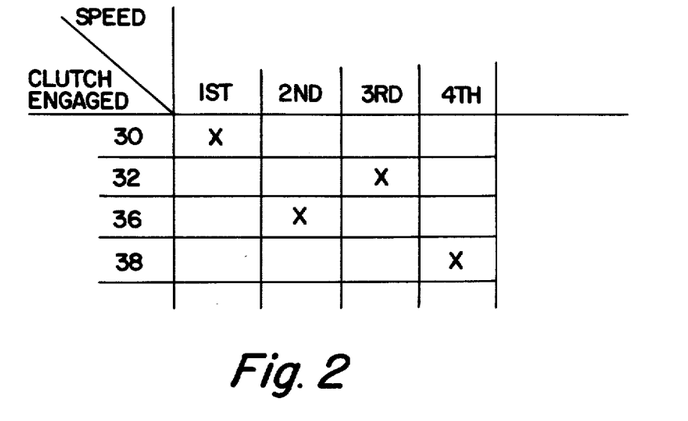
FIG. 2 is a table illustrating the engaged clutch for each forward speed of the transmission of FIG. 1.

Referring now to FIGS. 1 and 2, there is schematically illustrated a four forward speed simple powershift transmission (or transmission section) 10. Transmission 10 comprises an input shaft 12 which may be supported by suitable bearings or which may be mounted in a floating and/or pivoted manner as is well known in the prior art. Input shaft 12 is preferably driven by a one way prime mover (not shown) such as a diesel engine or the like, and preferably drives a conventional gear pump 14 for supplying pressurized hydraulic fluid for lubrication and cooling of the transmission and for providing pressurized fluid for clutch actuation as will be described in greater detail below. Three input gears, 16, 18 and 20 are mounted generally concentric with and rotatable relative to input shaft 12. Input gear 16 is the low speed input gear, input gear 20 is the second speed or next higher speed input gear and input gear 18 is the third speed or second highest speed gear. An output gear 22 is mounted to output shaft 24, as by a spline connection, for rotation therewith. It is noted that output shaft 24 is generally coaxial with input shaft 12. Output gear 22 is the highest speed, or direct drive, gear.

A first selectively actuated, hydraulically operated double acting friction clutch 26 is mounted to the input shaft 12 axially interposed input gears 16 and 18 for selectively rotationally coupling either input gear 16 or input gear 18 to the input shaft 12. A second selectively actuated, hydraulically operated double acting friction clutch 28 is mounted to the input shaft 12 axially interposed input gear 20 and output gear 22 for selectively rotationally coupling either input gear 20 or output gear 22 to the input shaft 12. The structure and function of double acting friction clutches 26 and 28 is convention and is well known in the art as may be seen by reference to U.S. Pat. Nos. 3,802,293; 3,465,609 and 3,619,714, all of which are hereby incorporated by reference. Briefly, clutch 26 comprises two frictional clutch portions or halves 30 and 32, each of which comprise interdigitated frictional clutch disks, and an axially movable clutch slider 34. Similarly, double acting clutch 28 comprises two clutch portions or halves 36 and 38, and an axially movable clutch slider 40. Clutch sliders 34 and 40 are shown schematically as being a single unit but it is understood that the actual structure of the clutch sliders may include two separately axially movable members such as hydraulic pistons or the like as is known in the art. As may be seen, movement of clutch slider 34 to the left will engage clutch 30 to rotationally fix input gear 16 to input shaft 12, movement of clutch slider 34 to the right will cause engagement of clutch 32 to rotationally fix input gear 18 to input shaft 2, movement of clutch slider 40 to the left will cause engagement of clutch 36 to rotationally fix input gear 20 to input shaft 12 and movement of clutch slider 40 to the right will cause engagement of clutch 38 to rotationally fix output gear 22 to input shaft 12. As output gear 22 is rotationally fixed to output shaft 24, engagement of clutch 38 will result in a direct driving connection between input shaft 12 and output shaft 24. Of course, less than full engagement of the friction clutches will permit slippage between the clutchable gears and input shaft.

Of course, double acting clutches 26 and 28 could be hydraulically actuated, air actuated, electrically actuated and/or mechanically actuated.

Transmission 10 is also provided with a plurality of substantially identical countershaft assemblies 42 and 42A, equally circumferentially spaced about input shaft 12. Each of the countershaft assemblies may be provided with a forward countershaft portion, 44 and 44A, and a rearward countershaft portion, 46 and 46A, fixed for rotation, as by a splined connection or the like, with the forward portion. Bearings 48, 50 and 52 are provided for supporting the countershafts. It is understood, that if a single piece countershaft is provided, it is preferable that only bearings 48 and 50 be utilized. Each of the countershafts carry countershaft gears 54, 56, 58 and 60 rotationally fixed thereto. Countershaft gears 54 are constantly meshed with input gear 16, countershaft gears 56 are constantly meshed with input gear 18, countershaft gears 58 are constantly meshed with input gear 20 and countershaft gears 60 are constantly meshed with output gear 22.

For first speed operation of transmission 10, clutch 30 is engaged and torque from input shaft 12 is transmitted via countershaft gears 54 and countershafts 42 and 42A to countershaft gears 60 which are constantly meshed with output gear 22 on output shaft 24. Similarly, second speed operation is through input gear 56 by engagement of clutch 32, third speed operation is through input gear 20 by engagement of clutch 36 and fourth or direct drive is through direct connection of input shaft 12 to output shaft 24 by engagement of clutch 38. Reference to FIG. 2 will illustrate the clutches engaged for each selected gear ratio of transmission 10.

Preferably, to better assure that the two countershaft assemblies 42 and 42A substantially share an equal torque transmitting capacity, input shaft 12 and/or input gears 16, 18 and 20 and/or output gear 22 are provided with a degree of radial movement or float as is well known in the art.

Pump 14, preferably a well known gear pump or the like, provides pressurized fluid to regulator R which supplies a valve V with a regulated supply of hydraulic fluid. Valve V, which may be automatically or manually controlled by a control C, will provide pressurized fluid for actuation of clutches 30, 32, 36 and/or 38. As is well known in the powershift transmission technology, and as may be seen in greater detail by reference to U.S. Pat. No. 3,762,518 which is hereby incorporated by reference, valve V will provide overlapping engagement of various of the friction clutches. For example, during a gear ratio shift from first gear, gear 16, to second gear, gear 20, clutch 30 will remain at least partially engaged as clutch 36 comes into engagement thereby providing a power path from the input shaft 12 to the output shaft 24 during the change in gear ratios as is well known in the powershift transmission art.

Figure 8:
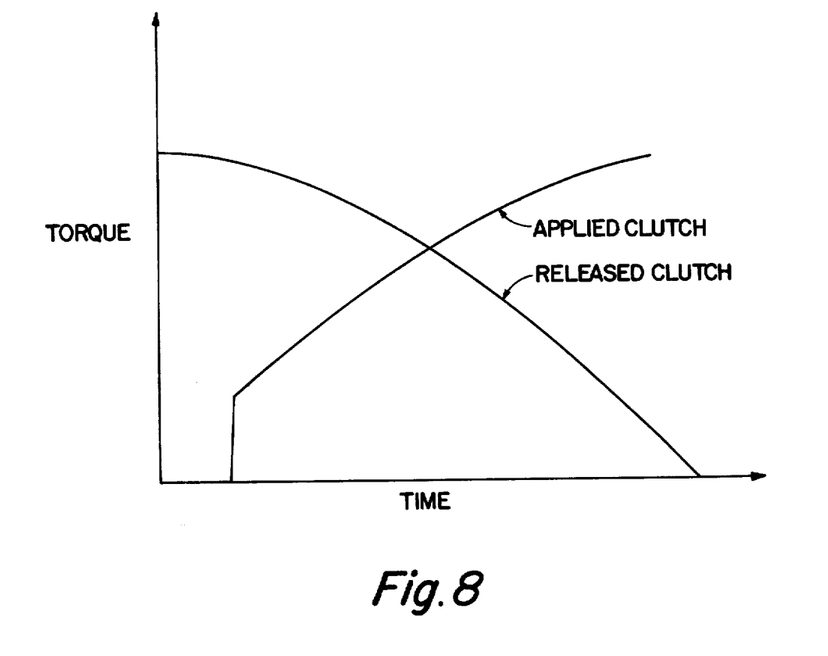
FIG. 8 is a graphical illustration of overlapping clutch engagement in a powershift transmission.

FIG. 8 graphically illustrates a typical overlapping engagement of the on-going and off-going powershift clutches during a gear change operation.

To provide for powershifting of transmission 10, when utilizing double acting clutches which may not be engaged on both sides simultaneously, while also providing for multiple substantially identical countershafts, each of which countershafts carry a substantially equal torque load in each selected gear ratio and during each gear change, it is important that neither of the double acting clutch mechanisms, 26 and 28, is utilized to selectively engage any two sequentially engaged gear ratios. Accordingly, double acting clutch 26 with its clutch portions 30 and 32 is utilized to engage first and third gear speed ratios while double acting clutch 28 with its clutch portions or halves 36 and 38 is utilized to engage second and fourth gear ratios.

Figure 7:
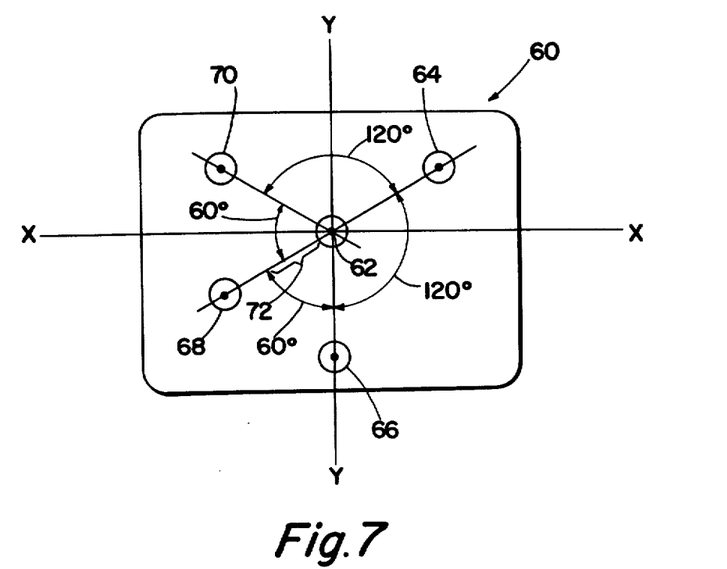
FIG. 7 is a schematic illustration of a transmission case end wall suitable for use in either a twin or triplet countershaft transmission assembly.

The transmission 10 illustrated in FIG. 1 utilizes two substantially identical countershaft assemblies 42 and 42A and is usually referred to as a twin countershaft transmission. To increase the torque carrying capacity of such a transmission it is often desirable to provide a third substantially identical countershaft assembly, i.e. to provide a triplet countershaft transmission. To provide a family of transmissions comprising a twin countershaft version and a triplet countershaft version, while utilizing a maximum of substantially identical components and common housings or casings, the bore pattern of the transmission housing end walls which support the countershaft bearings 48 and 52 and the transmission intermediate wall (if any) which will support the countershaft bearings 50 (if any) is illustrated schematically in FIG. 7. End wall 60 is provided with a centrally located bore 62 through which the input shaft 12 or output shaft 24 passes and in which bearings may be provided. Four bores, 64, 66, 68 and 70, which may be blind bores in the case of end walls or through bores in the case of intermediate walls, are provided. The centers of bores 64, 66, 68 and 70 are equal distance from the centerline of bore 62. This distance 72 is generally referred to as the centerline distance of the transmission. Moving in the clockwise direction, second bore 66 is rotationally displaced by 120° from first bore 64. Third bore 68 is rotationally displaced from second bore 66 by an angular displacement of 60°. Fourth bore 70 is rotationally displaced from third bore 68 by a rotational displacement of 60°. First bore 64 is rotationally displaced from fourth bore 70 by an angular displacement of 120°. If wall 60 is to be utilized for a twin countershaft transmission, first bore 64 and third bore 68 which are angularly displaced by 180° will be utilized for receiving and retaining the countershaft support bearings and/or allowing passage of countershafts therethrough. If a triplet countershaft transmission is to be provided, first bore 64, second bore 66 and fourth bore 70 will be utilized for receiving and supporting countershaft bearings and/or allowing the passage of countershafts therethrough. First bore 64, second bore 66 and fourth bore 70 are angularly displaced by 120°. Accordingly, a transmission casing having side walls, and an intermediate wall if necessary, each of which are provided with four bores surrounding the centrally located bore 62 in the manner shown in FIG. 7, may be utilized for either a twin countershaft or a triplet countershaft transmission. Additionally, by providing input gears having a number of teeth which are evenly divisible by both two and by three, substantially identical countershaft assemblies may be utilized in connection with both the twin countershaft and triplet countershaft transmission. Although the optional feature schematically illustrated in FIG. 7 is shown in connection with a multiple substantially identical powershift transmission, it is understood, that this feature is equally applicable to any substantially identical countershaft transmissions wherein it may be desirable to provide either a twin or triplet countershaft version thereof utilizing common components in a common casing, such as the transmissions illustrated in the above mentioned U.S. Pat. Nos. 3,105,395 and 3,500,695.

Figure 3:
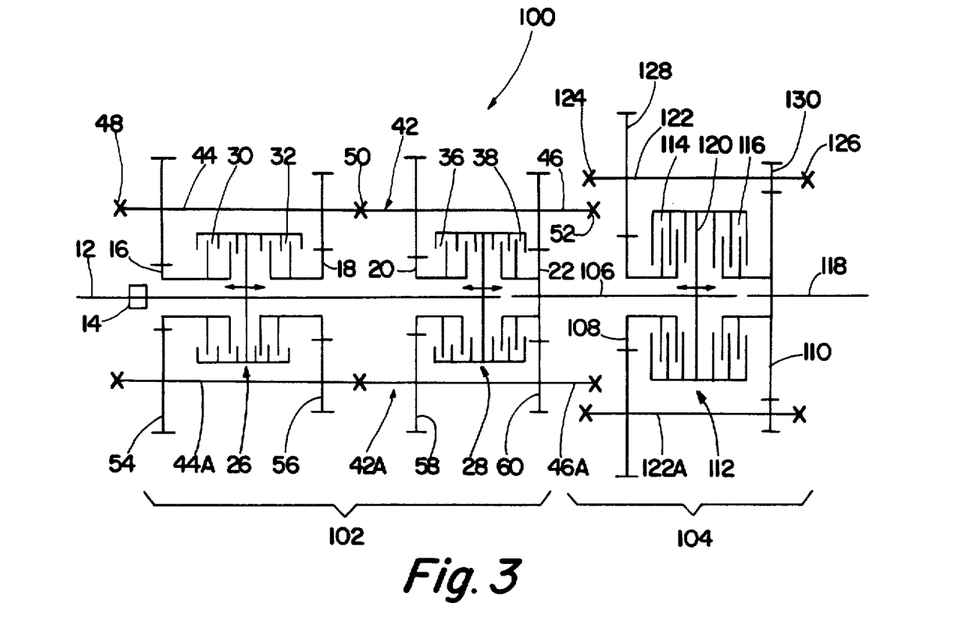
FIG. 3 is a schematic illustration of an eight forward speed compound transmission utilizing a four forward speed powershift transmission section similar to that illustrated in FIG. 1 as the main transmission section thereof.
Figure 4:
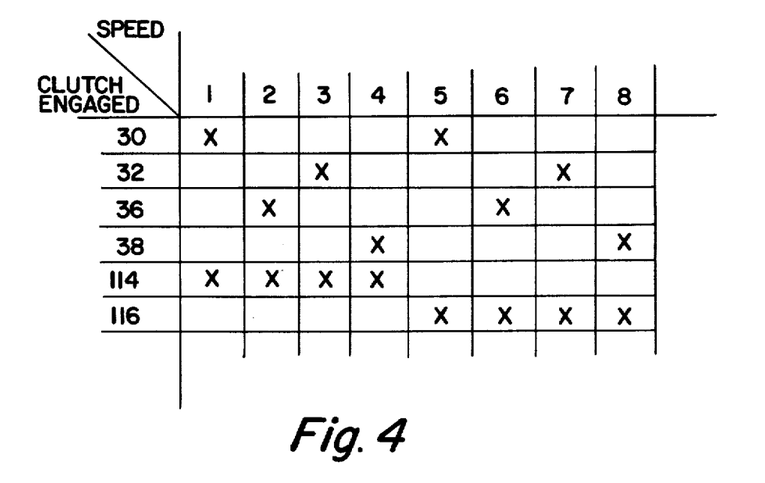
FIG. 4 is a table illustrating the clutch engagement for each forward speed of the transmission of FIG. 3.
Figure 5:
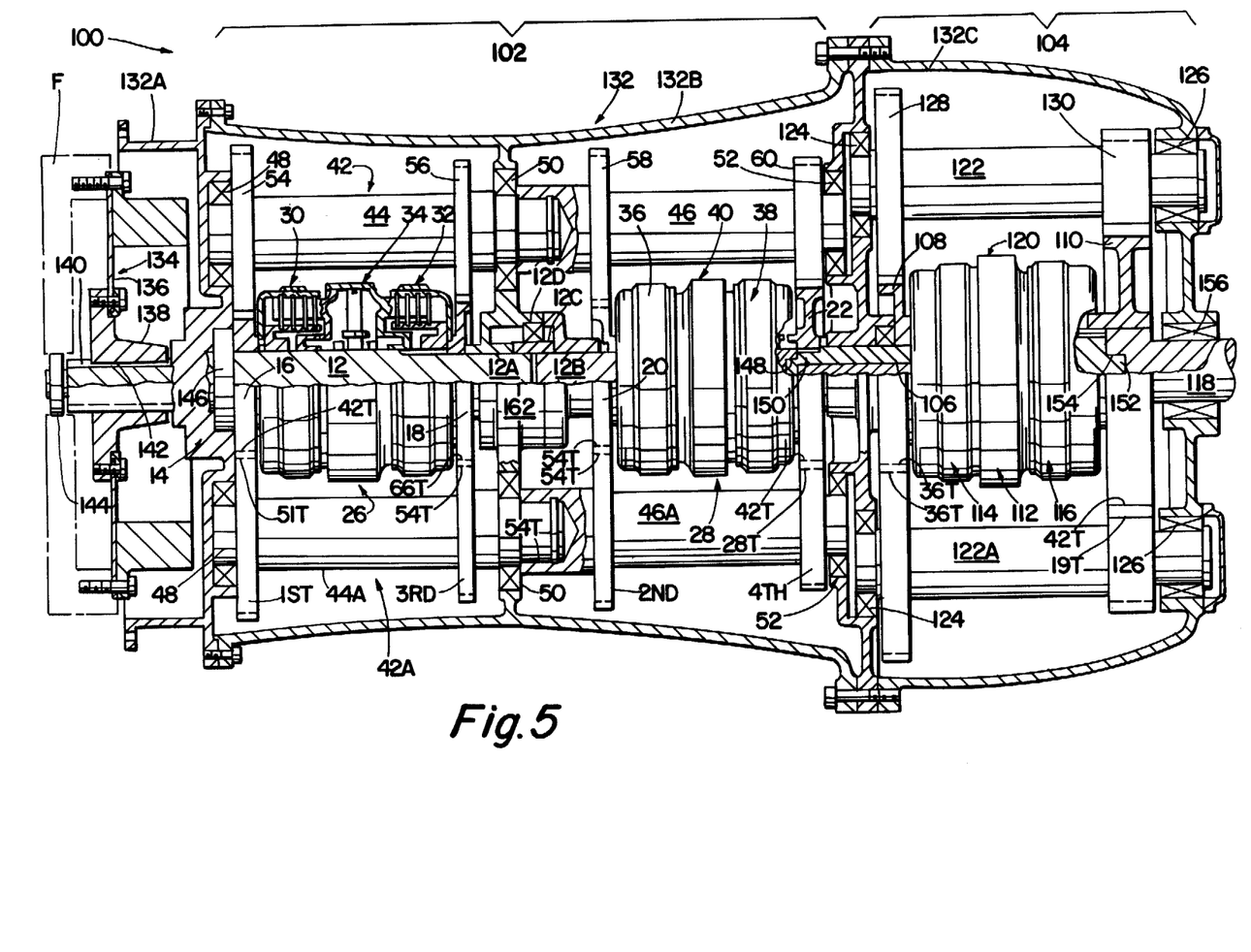
FIG. 5 is an elevational view, partial in section of the transmission of FIG. 3.

An alternate embodiment of the present invention may be seen by reference to FIGS. 3, 4 and 5. In FIG. 3, a compound transmission 100 having a powershift twin countershaft four speed main transmission section 102 and a twin countershaft auxiliary range section 104 is illustrated. Auxiliary section 104 is connected in series with main section 102 as is well known in the art. The main transmission section 102 is substantially identical to transmission 10 described above and similar elements thereof will be assigned like reference numerals and will be only briefly redescribed below.

Transmission 100 includes an input shaft 12 driven by an unshown prime mover and preferably drives a pump 14 which is preferably a gear pump or the like. Input gears 16, 18 and 20 are concentric with the input shaft 12 and normally rotatably thereto. Main section output gear 22 is rotationally fixed to an intermediate shaft 106 which provides an input to the auxiliary transmission section 104. Double acting frictional clutch assemblies 26 and 28 comprising clutch halves 30 and 32, and 36 and 38, respectively, are provided for selectively frictionally coupling the input gears and the main section output gear to the input shaft. Substantially identical countershaft assemblies 42 and 42A, which may include forward countershaft portions 44 and 44A and rearward portions 46 and 46A, are supported by bearings 48, 50 and 52 and carry countershaft gears 54, 56, 58 and 60 which are constantly meshed with input gears 16, 18 and 20 and main section output gear 22, respectively. Intermediate gear 108 and output gear 110 are concentric with intermediate shaft 106 and normally rotatable relative thereto. Output gear 110 is fixed to output shaft 118 for rotation therewith. Double acting friction clutch assembly 112 is mounted to intermediate shaft 106 interposed intermediate gear 108 and output gear 110 and is rotatable with intermediate shaft 106. Double acting clutch assembly 112 is similar in operation and structure to clutches 26 and 28 discussed above but is preferably of a larger torque transmitting capacity. Double acting clutch 112 includes a first clutch half 114 for frictionally coupling intermediate gear 108 to intermediate shaft 106 and a second clutch half 116 for coupling output gear 110 to intermediate shaft 106. Of course, engagement of clutch half 116 to couple output gear 110 to intermediate shaft 106 will couple output shaft 118 directly to intermediate shaft 106. Output shaft 118 and intermediate shaft 106 are generally concentric with input shaft 12. Double acting clutch is provided with a clutch slider member 120 which is schematically illustrated as a single member but may in fact comprise two independently operable pistons or the like, one for each clutch half 114 and 116.

The intermediate portion 104 is also provided with a pair of substantially identical intermediate countershafts 122 and 122A supported by bearings 124 and 126. Each of the auxiliary countershaft assemblies 122 and 122A carries intermediate countershaft gears 128 and 130 which are constantly meshed with intermediate gear 108 and output gear 110, respectively.

As may be seen by reference to FIG. 4, to operate in the low range (speeds 1-4), clutch 114 is engaged and torque from the intermediate shaft 106 passes through intermediate gear 108 through intermediate countershaft gear 128 intermediate countershaft 122, intermediate countershaft gear 130, output gear 110 and through output shaft 118. To operate in the high or direct range (speeds 5-8), clutch 116 is engaged coupling intermediate shaft 106 directly to intermediate shaft 118.

Appropriate valving and controls are provided operation of the clutches 30, 32, 36, 38, 114 and 116 is known in the art. It is noted that operation in the low range, that is operation in first through fourth speeds is powershift operation and operation in the high range, that is fifth through eighth speed operation, is powershift operation. However, during a so called "double swap shift", wherein shifting is between fourth and fifth speed requiring a shifting of both the auxiliary and the main transmission sections, a break in power does exist. Accordingly, transmission 100 is not a powershift transmission during fourth to fifth speed shifts nor during fifth to fourth speed downshifts.

Transmission 100 may be seen in an elevational view, partially in section, by reference to FIG. 5. As may be seen, transmission 100 is enclosed in a suitable casing or housing 132 which may comprise portions 132A, 132B and 132C all of which are bolted together in a conventional manner. Flywheel F is driven by a prime mover, such as a diesel engine (not shown), and preferably drives the input shaft 12 through a flex-plate assembly 134 comprising a plurality of flexible steel disks 136 and a central hub portion 138 splined to the input shaft 12 at splines 140 and 142. The flywheel F may be supported on the input shaft at bearing 144. The forward end of input shaft 12 may be supported by bearings 146 while the rearward end of input shaft 12 is provided with a cavity 148 which receives a pilot portion 150 of the intermediate shaft 106. The rearward end of the intermediate shaft 106 is provided with a pilot portion 152 which is received in a cavity 154 in the forward end of the output shaft 118. Output shaft 118 is preferably supported by a bearing assembly 156. Input shaft may be a one piece structure or may be formed in two portions, 12A and 12B, which are directly splined or are joined by a splined connector 12C which is supported by a bearing 12D.

Figure 6:
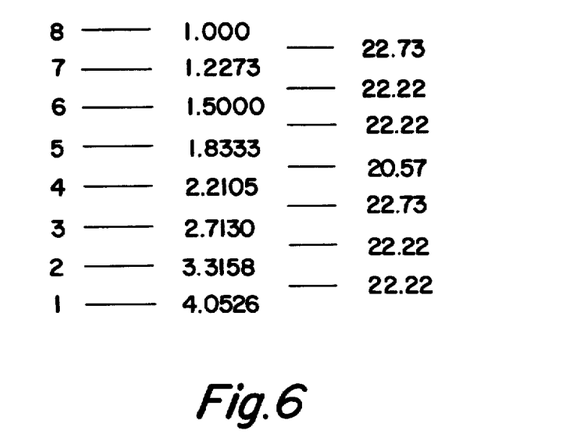
FIG. 6 is a table illustrating the gear ratios and percent steps between the gear ratios of the various speeds of the transmission of FIG. 3.

It is noted that input gear 16 is provided with 42 teeth (42T); input gear 18 is provided with 66 teeth (66T); input gear 20 is provided with 54 teeth (54T); main section output gear 22 is provided with 42 teeth (42T); intermediate gear 108 is provided with 36 teeth (36T) and output gear 110 is provided 42 teeth (42T), all of which numbers of teeth are evenly divisible by both two and three. Accordingly, by utilization of end walls and intermediate walls as illustrated in FIG. 7 and discussed above, transmission 100 may be provided in either a twin countershaft or triplet countershaft configuration utilizing the same housing 132, the same input gears and input shaft, the same intermediate gear intermediate shaft, the same clutch structure and the same output shaft. Of course, a third countershaft assembly, substantially identical to countershaft assemblies 42 and 42A, will be required for a triplet countershaft transmission. Countershaft gear 54 is provided with 51 teeth (51T), countershaft gear 56 with 54 teeth (54T), countershaft gear 58 with 54 teeth (54T), countershaft gear 60 with 28 teeth (28T), intermediate countershaft gear 128 with 36 teeth (36T) and intermediate countershaft gear 130 with 19 teeth (19T). The gear ratios and percent steps for a transmission having the gear structure illustrated is shown in FIG. 6.

As may be seen, countershaft portions 44 and 46 are joined at a splined connection 158. Preferably, splined connection 158 will allow for slight noncoaxial alignment of the countershaft portions as is necessary for a three bearing support of the countershaft assemblies. Countershaft gears 56 and 58 are provided with an equal number of gear teeth, 54 teeth (54T), and the splined coupling 158 between the forward, 44 and 44A, and rearward, 46 and 46A, countershaft portions is also provided with 54 teeth (54T). Accordingly, if the alignment of the teeth of gears 58 and 60 relative to the splines is identical on both rearward countershaft portions, 46 and 46A, and if the alignment of the teeth of gears 54 and 56 relative to the splines is identical on both forward countershaft portions, 44 and 44A, the countershafts 42 and 42A will automatically be properly timed when assembled. A more detailed discussion of this structure may be seen by reference to U.S. application Ser. No. 165,833, filed Jul. 3, 1980 and assigned to the Assignee of this invention.

Various fluid passages, seals and the like (not shown) are provided in the intermediate wall portion 162 of housing 132 and the input shaft 12 for supplying lubricating fluid and clutch actuation fluid. Various thrust bearings, rings and the like (not shown) are provided on the shafts as is known in the art.

It may thus be seen that a change gear powershift transmission, or powershift transmission section, is provided which utilizes substantially identical countershaft assemblies, which countershaft assemblies carry a substantially equal portion of the torque load in each engaged gear and during each powershift. By utilizing specially configured end walls and/or intermediate walls, a common transmission case, common input shaft, common input gears and common countershaft assembly may be utilized for providing twin and/or triplet countershaft powershift transmission or transmission sections.

Although this invention has been described in its preferred form with a certain degree of particularity, it is understood that the present disclosure of the preferred form is for descriptive purposes only and that various modifications and changes of the detailed construction and arrangement of the parts may be resorted to without departing from the spirit and the scope of the invention as claimed.

I claim:

1. A four speed change speed powershift transmission mechanism (10) comprising:
   a transmission housing (132);
   a rotatable input (12) shaft rotatably supported in said transmission housing;
   a first input gear (161) coaxially surrounding said input shaft and rotatable relative thereto;
   a second input gear (18) coaxially surrounding said input shaft and rotatable relative thereto, said second input gear axially spaced from said first input gear in a first axial direction;
   a third input gear (20) coaxially surrounding said input shaft and rotatable relative thereto, said third input gear axially spaced from said second input gear in said first axial direction whereby said second input gear is axially interposed said first and third input gears;
   an output gear (22) coaxial with said input shaft and rotatable relative thereto, said output gear axially spaced from said third input gear in said first axial direction whereby said third input gear is axially interposed said second input gear and said output gear;
   an output shaft (24) generally coaxial with said input shaft rotatably supported in said housing, said output gear rotationally fixed to said output shaft;
   said transmission characterized by:
   a first frictional clutch (30) coaxial with and driven by said input shaft said first clutch selectively engageable to rotationally couple said first input gear to said input shaft, engagement of said first clutch effective to provide first speed operation of said transmission;
   a second frictional clutch (32) coaxial with and driven by said input shaft, said second clutch selectively engageable to rotationally couple said second input gear to said input shaft, engagement of said second clutch effective to provide third speed operation of said transmission;
   a third frictional clutch (36) coaxial with and driven by said input shaft, said third clutch selectively engageable to rotationally couple said third input gear to said input shaft, engagement of said third clutch effective to provide second speed operation of said transmission;
   a fourth frictional clutch (38) coaxial with and driven by said input shaft, said fourth clutch selectively engageable to rotationally couple said output gear to said input shaft, engagement of said fourth clutch effective to provide fourth speed operation of said transmission;
   said first and second frictional clutches comprising a first double acting frictional clutch mechanism (26) axially interposed said first and second input gears and said third and fourth frictional clutches comprising a second double acting clutch mechanism (28) axially interposed said third and fourth input gears;
   a plurality of substantially identical countershafts (42, 42A) rotatably supported in said housing, each of said countershafts carrying a first (54), second (56), third (58) and fourth (60) countershaft gear fixed thereto, said countershaft gears constantly meshed with said first, second and third input gears and said output gear, respectively; and
   control means for engaging and disengaging said clutch means, said control means causing overlapping engagement of the clutch means being engaged and the clutch means being released.

2. The powershift transmission mechanism of claim 1 wherein said first and second friction clutches are not simultaneously engageable and said third and fourth friction clutches are not simultaneously engageable.

3. The powershift transmission mechanism of claim 2 wherein each of said countershaft assemblies comprises a forward countershaft portion (44, 44A) carrying said first and second countershaft gears and a rearward countershaft portion (46, 46A) carrying said third and fourth countershaft gears and said forward and rearward portions are joined in a splined connection, said countershaft supported by a bearing at each end thereof and an intermediate bearing (50) adjacent said splined connection.

4. The powershift transmission of claim 2, wherein said housing is provided with front and rear end walls each of which is provided with four bores capable of receiving and retaining countershaft supporting bearings therein, each of said four bores equally radially spaced from the axis of said input shaft, said second bore rotationally displaced from said first bore by 120° in a given direction of rotation, said third bore rotationally displaced from said second bore by 60° in said given direction of rotation, said fourth bore rotationally displaced from said third bore by 60° in said given direction of rotation whereby said first and third bores are provided with countershaft supporting bearings to provide a twin countershaft transmission and said first, second and fourth bores are provided with countershaft supporting bearings for a triplet countershaft transmision.

5. The powershift transmission of claim 4 wherein all of said input gears and said output gear are provided with a number of gear teeth thereon evenly divisible by both two and by three whereby substantially identical countershaft assemblies may be utilized for either a twin or triplet countershaft transmission.

6. An improved substantially identical multiple countershaft change speed transmission (10) comprising:
- a transmission housing;
- a centrally located shaft (12) rotatably supported in said housing;
- a plurality of central gears (16, 18, 20) concentric with and rotatable relative to said housing;
- clutch means (30, 32, 36) for selectively clutching said central gears to said shaft; countershafts (42, 42A) rotatably supported in said housing, said countershafts equally circumferentially spaced about said shaft;
- a plurality of countershaft gears (54, 56, 58) fixed to each of said countershafts, one countershaft gear on each countershaft constantly meshed with each of said central gears, the improvement characterized by:
- said housing provided with a forward and rearwall end wall, each of said end walls provided with four bores equally radially spaced from the centerline of said shaft, each of said bores capable of receiving and retaining a countershaft supporting bearing, said second bore rotationally displaced from said first bore by 120° in a given direction of rotation, said third bore rotationally displaced from said second bore by 60° of rotation in said given direction of rotation, said fourth bore rotationally displaced from said third bore by 60° in said given direction of rotation, whereby said countershafts may be supported by bearings in said first and third bores for a twin countershaft transmission and by bearings in said first, second and fourth bores for a triplet countershaft transmission, and
- said central gears are each provided with a number of gear teeth evenly divisible by two and by three whereby identical countershafts may be utilized for both twin and triplet countershaft transmissions.

* * * * *